United States Patent
Li et al.

(10) Patent No.: US 9,961,678 B2
(45) Date of Patent: May 1, 2018

(54) MASTER STATION AND METHOD FOR HEW COMMUNICATION WITH SIGNAL FIELD CONFIGURATION FOR HEW OFDMA MU-MIMO WIDEBAND CHANNEL OPERATION

(71) Applicant: Intel IP Corporation, Santa Clara, CA (US)

(72) Inventors: Guoqing C. Li, Portland, OR (US); Shahrnaz Azizi, Cupertino, CA (US); Thomas J. Kenney, Portland, OR (US); Eldad Perahia, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 12 days.

(21) Appl. No.: 15/023,262

(22) PCT Filed: Sep. 17, 2014

(86) PCT No.: PCT/US2014/055996
§ 371 (c)(1),
(2) Date: Mar. 18, 2016

(87) PCT Pub. No.: WO2015/076917
PCT Pub. Date: May 28, 2015

(65) Prior Publication Data
US 2016/0242173 A1    Aug. 18, 2016

Related U.S. Application Data

(60) Provisional application No. 61/906,059, filed on Nov. 19, 2013, provisional application No. 61/973,376, (Continued)

(51) Int. Cl.
*H04W 72/04* (2009.01)
*H04L 5/00* (2006.01)
(Continued)

(52) U.S. Cl.
CPC ...... *H04W 72/0433* (2013.01); *H04B 7/0452* (2013.01); *H04L 5/0023* (2013.01);
(Continued)

(58) Field of Classification Search
CPC .... H04B 7/0452; H04W 16/14; H04W 28/06; H04W 52/241; H04W 52/267
See application file for complete search history.

(56) References Cited

U.S. PATENT DOCUMENTS 7,809,020 B2    10/2010    Douglas et al.
8,395,997 B2    3/2013    Banerjea et al.
(Continued)

FOREIGN PATENT DOCUMENTS

CN    101433018 A    5/2009
CN    103703711 A    4/2014
(Continued)

OTHER PUBLICATIONS

U.S. Appl. No. 14/338,137 now U.S. Pat. No. 9,325,463, filed Jul. 22, 2014, High-Efficiency WLAN (HEW) Master Station and Methods to Increase Information Bits for HEW Communication.

(Continued)

*Primary Examiner* — Chandrahas B Patel
(74) *Attorney, Agent, or Firm* — Schwegman Lundberg & Woessner, P.A.

(57) ABSTRACT

Embodiments of master station and method for high-efficiency WLAN (HEW) communication are generally described herein. In some embodiments, the master station is configured for HEW communication in accordance with an IEEE 802.11ax technique. The master station may transmit an indication to one or more of a plurality of HEW stations to indicate which one of a plurality of 20 MHz channels to monitor for a HEW signal field. The master station may configure the HEW signal field to indicate which
(Continued)

of a plurality of subchannels of the indicated 20 MHz channel is allocated to the HEW stations for communication. The master station may transmit the configured HEW signal field in the indicated one of the 20 MHz channels and may communicate with the HEW stations on the indicated subchannels in accordance with an orthogonal-frequency divisional multiple access (OFDMA) technique.

23 Claims, 3 Drawing Sheets

Related U.S. Application Data filed on Apr. 1, 2014, provisional application No. 61/976,951, filed on Apr. 8, 2014, provisional application No. 61/986,256, filed on Apr. 30, 2014, provisional application No. 61/986,250, filed on Apr. 30, 2014, provisional application No. 61/990,414, filed on May 8, 2014, provisional application No. 61/991,730, filed on May 12, 2014, provisional application No. 62/013,869, filed on Jun. 18, 2014, provisional application No. 62/024,813, filed on Jul. 15, 2014, provisional application No. 62/024,801, filed on Jul. 15, 2014, provisional application No. 62/026,277, filed on Jul. 18, 2014.

(51) Int. Cl.
  *H04B 7/0452* (2017.01)
  *H04L 27/26* (2006.01)
  *H04W 84/12* (2009.01)

(52) U.S. Cl.
  CPC ........ *H04L 5/0094* (2013.01); *H04L 27/2602* (2013.01); *H04W 72/0453* (2013.01); *H04L 5/003* (2013.01); *H04W 84/12* (2013.01)

(56) References Cited

U.S. PATENT DOCUMENTS

| | | | |
|---|---|---|---|
| 8,509,323 B2 | 8/2013 | Nangia et al. | |
| 8,560,009 B2 | 10/2013 | Etemad | |
| 8,948,064 B2* | 2/2015 | Shahar | H04L 5/0037 370/278 |
| 8,989,158 B2* | 3/2015 | Seok | 370/338 |
| 9,160,503 B2 | 10/2015 | Kim et al. | |
| 9,271,241 B2 | 2/2016 | Kenney et al. | |
| 9,325,463 B2 | 4/2016 | Azizi et al. | |
| 9,450,725 B2 | 9/2016 | Azizi et al. | |
| 9,462,504 B2 | 10/2016 | Stephens et al. | |
| 9,544,914 B2 | 1/2017 | Azizi et al. | |
| 9,615,291 B2 | 4/2017 | Kenney et al. | |
| 9,648,620 B2 | 5/2017 | Tandra | |
| 9,705,643 B2 | 7/2017 | Li et al. | |
| 2004/0146117 A1 | 7/2004 | Subramaniam et al. | |
| 2005/0135410 A1 | 6/2005 | Stephens | |
| 2005/0276347 A1 | 12/2005 | Mujtaba et al. | |
| 2006/0018249 A1 | 1/2006 | Shearer et al. | |
| 2006/0030322 A1 | 2/2006 | Kim et al. | |
| 2006/0067415 A1 | 3/2006 | Mujtaba | |
| 2007/0014375 A1 | 1/2007 | Nakao | |
| 2007/0060161 A1 | 3/2007 | Chindapol et al. | |
| 2007/0147226 A1 | 6/2007 | Khandekar et al. | |
| 2007/0147521 A1 | 6/2007 | Horng et al. | |
| 2007/0153929 A1 | 7/2007 | Ballentin et al. | |
| 2007/0202816 A1 | 8/2007 | Zheng | |
| 2007/0242600 A1 | 10/2007 | Li et al. | |
| 2008/0013496 A1 | 1/2008 | Dalmases et al. | |
| 2008/0049851 A1 | 2/2008 | Nangia et al. | |
| 2008/0188232 A1 | 8/2008 | Park et al. | |
| 2008/0240018 A1 | 10/2008 | Xue et al. | |
| 2008/0240275 A1 | 10/2008 | Cai | |
| 2009/0122882 A1 | 5/2009 | Mujtaba | |
| 2009/0310692 A1 | 12/2009 | Kafle et al. | |
| 2010/0046671 A1 | 2/2010 | Ali et al. | |
| 2010/0067480 A1 | 3/2010 | Wang et al. | |
| 2010/0080312 A1 | 4/2010 | Moffatt et al. | |
| 2010/0091673 A1 | 4/2010 | Sawai et al. | |
| 2010/0107042 A1 | 4/2010 | Sawai et al. | |
| 2010/0157956 A1 | 6/2010 | Takahashi | |
| 2010/0157970 A1 | 6/2010 | Gotman et al. | |
| 2010/0220679 A1 | 9/2010 | Abraham et al. | |
| 2010/0246375 A1 | 9/2010 | Orlik et al. | |
| 2010/0246539 A1* | 9/2010 | Guillouard | H04B 7/2656 370/336 |
| 2010/0260159 A1 | 10/2010 | Zhang et al. | |
| 2010/0309834 A1 | 12/2010 | Fischer et al. | |
| 2010/0322166 A1 | 12/2010 | Sampath et al. | |
| 2011/0013608 A1 | 1/2011 | Lee et al. | |
| 2011/0032850 A1 | 2/2011 | Cai | |
| 2011/0038441 A1 | 2/2011 | Shi | |
| 2011/0075625 A1 | 3/2011 | Nyström et al. | |
| 2011/0085513 A1 | 4/2011 | Chen et al. | |
| 2011/0096685 A1 | 4/2011 | Lee et al. | |
| 2011/0116401 A1 | 5/2011 | Banerjea et al. | |
| 2011/0149882 A1 | 6/2011 | Gong et al. | |
| 2011/0194544 A1 | 8/2011 | Yang et al. | |
| 2011/0206156 A1 | 8/2011 | Lee et al. | |
| 2011/0222486 A1 | 9/2011 | Hart | |
| 2011/0235593 A1 | 9/2011 | Gong et al. | |
| 2011/0243025 A1 | 10/2011 | Kim et al. | |
| 2011/0249660 A1 | 10/2011 | Noh et al. | |
| 2011/0261769 A1 | 10/2011 | Ji et al. | |
| 2011/0268094 A1 | 11/2011 | Gong et al. | |
| 2011/0299474 A1 | 12/2011 | Li et al. | |
| 2011/0305296 A1 | 12/2011 | Van Nee | |
| 2012/0002756 A1 | 1/2012 | Zhang et al. | |
| 2012/0063433 A1 | 3/2012 | Wentink | |
| 2012/0106481 A1 | 5/2012 | Cho et al. | |
| 2012/0155444 A1 | 6/2012 | Chiueh et al. | |
| 2012/0201213 A1 | 8/2012 | Banerjea et al. | |
| 2012/0218983 A1 | 8/2012 | Noh et al. | |
| 2012/0243485 A1 | 9/2012 | Merlin et al. | |
| 2012/0269124 A1 | 10/2012 | Porat | |
| 2012/0275446 A1 | 11/2012 | Stacey et al. | |
| 2012/0314697 A1 | 12/2012 | Noh et al. | |
| 2012/0327870 A1 | 12/2012 | Grandhi et al. | |
| 2012/0327915 A1 | 12/2012 | Kang et al. | |
| 2013/0070642 A1 | 3/2013 | Kim et al. | |
| 2013/0136075 A1 | 5/2013 | Yu et al. | |
| 2013/0142155 A1 | 6/2013 | Trainin et al. | |
| 2013/0177090 A1 | 7/2013 | Yang et al. | |
| 2013/0188567 A1 | 7/2013 | Wang et al. | |
| 2013/0188572 A1 | 7/2013 | Cheong et al. | |
| 2013/0229996 A1 | 9/2013 | Wang et al. | |
| 2013/0230035 A1 | 9/2013 | Grandhi et al. | |
| 2013/0235720 A1 | 9/2013 | Wang et al. | |
| 2013/0250940 A1 | 9/2013 | Parlamas | |
| 2013/0258975 A1 | 10/2013 | Krishnamurthy et al. | |
| 2013/0265907 A1 | 10/2013 | Kim et al. | |
| 2013/0286925 A1 | 10/2013 | Fischer et al. | |
| 2013/0286959 A1 | 10/2013 | Lou et al. | |
| 2013/0301551 A1 | 11/2013 | Ghosh et al. | |
| 2013/0301563 A1 | 11/2013 | Gupta et al. | |
| 2014/0010196 A1 | 1/2014 | Shapira | |
| 2014/0169245 A1 | 6/2014 | Kenney et al. | |
| 2014/0169356 A1 | 6/2014 | Noh et al. | |
| 2014/0211775 A1 | 7/2014 | Sampath et al. | |
| 2014/0269544 A1 | 9/2014 | Zhu et al. | |
| 2014/0307650 A1 | 10/2014 | Vermani et al. | |
| 2014/0369276 A1 | 12/2014 | Porat et al. | |
| 2015/0023335 A1 | 1/2015 | Vermani et al. | |
| 2015/0063255 A1 | 3/2015 | Tandra et al. | |
| 2015/0063318 A1 | 3/2015 | Merlin et al. | |
| 2015/0085836 A1 | 3/2015 | Kang et al. | |
| 2015/0117428 A1 | 4/2015 | Lee et al. | |
| 2015/0124690 A1 | 5/2015 | Merlin et al. | |
| 2015/0124745 A1 | 5/2015 | Tandra et al. | |
| 2015/0131517 A1 | 5/2015 | Chu et al. | |
| 2015/0131756 A1 | 5/2015 | Suh et al. | |
| 2015/0139090 A1 | 5/2015 | Stephens et al. | |

(56) References Cited

U.S. PATENT DOCUMENTS

| | | |
|---|---|---|
| 2015/0139091 A1 | 5/2015 | Azizi et al. |
| 2015/0139118 A1 | 5/2015 | Azizi et al. |
| 2015/0139119 A1 | 5/2015 | Azizi et al. |
| 2015/0139205 A1 | 5/2015 | Kenney et al. |
| 2015/0139206 A1 | 5/2015 | Azizi et al. |
| 2015/0146808 A1 | 5/2015 | Chu et al. |
| 2015/0207599 A1 | 7/2015 | Kim et al. |
| 2015/0208394 A1* | 7/2015 | Seo .................. H04W 72/042 370/329 |
| 2015/0237531 A1 | 8/2015 | Hao et al. |
| 2016/0020885 A1 | 1/2016 | Li et al. |
| 2016/0112899 A1 | 4/2016 | Kenney et al. |
| 2016/0211961 A1 | 7/2016 | Azizi et al. |
| 2016/0227572 A1 | 8/2016 | Li et al. |
| 2016/0241366 A1 | 8/2016 | Azizi et al. |
| 2017/0005709 A1 | 1/2017 | Li et al. |
| 2017/0019916 A1 | 1/2017 | Azizi et al. |
| 2017/0111154 A1 | 4/2017 | Azizi et al. |
| 2017/0135035 A1 | 5/2017 | Azizi et al. |
| 2017/0201359 A1 | 7/2017 | Li et al. |

FOREIGN PATENT DOCUMENTS

| | | |
|---|---|---|
| CN | 105379217 A | 3/2016 |
| CN | 105637968 A | 6/2016 |
| CN | 105659656 A | 6/2016 |
| CN | 105659681 A | 6/2016 |
| CN | 105900511 A | 8/2016 |
| CN | 105917611 A | 8/2016 |
| CN | 106100807 A | 11/2016 |
| CN | 106464652 A | 2/2017 |
| CN | 106465360 A | 2/2017 |
| EP | 2362580 A2 | 8/2011 |
| EP | 2499872 A1 | 9/2012 |
| EP | 3072255 A1 | 9/2016 |
| EP | 3072270 A1 | 9/2016 |
| EP | 3072324 A1 | 9/2016 |
| EP | 3072344 A1 | 9/2016 |
| EP | 3072345 A1 | 9/2016 |
| EP | 3072347 A1 | 9/2016 |
| JP | 2007074689 A | 3/2007 |
| KR | 1020110044938 A | 5/2011 |
| KR | 1020120127676 A | 11/2012 |
| TW | 200539601 A | 12/2005 |
| TW | 201044815 A | 12/2010 |
| TW | 201141288 A | 11/2011 |
| TW | 201234880 A | 8/2012 |
| TW | 201251382 A | 12/2012 |
| TW | 201301827 A | 1/2013 |
| TW | 201306533 A | 2/2013 |
| TW | 201322786 A | 6/2013 |
| TW | 201349815 A | 12/2013 |
| TW | 201406107 A | 2/2014 |
| TW | 201534074 A | 9/2015 |
| TW | 201540029 A | 10/2015 |
| TW | 201540118 A | 10/2015 |
| TW | 201541889 A | 11/2015 |
| TW | 201541890 A | 11/2015 |
| TW | 201547248 A | 12/2015 |
| TW | 201547313 A | 12/2015 |
| TW | 201605191 A | 2/2016 |
| TW | 201605271 A | 2/2016 |
| TW | 201608863 A | 3/2016 |
| TW | 201622458 A | 6/2016 |
| TW | 201632022 A | 9/2016 |
| TW | I572160 B | 2/2017 |
| TW | I572173 B | 2/2017 |
| TW | I573413 B | 3/2017 |
| TW | I578837 B | 4/2017 |
| TW | I578838 B | 4/2017 |
| WO | WO-2005053198 A2 | 6/2005 |
| WO | WO-2008118429 A1 | 10/2008 |
| WO | WO-2011025146 A2 | 3/2011 |
| WO | WO-2011068387 A2 | 6/2011 |
| WO | WO-2012057547 A2 | 5/2012 |
| WO | WO-2012106635 A1 | 8/2012 |
| WO | WO-2013055117 A2 | 4/2013 |
| WO | WO-2013058512 A1 | 4/2013 |
| WO | WO-2013077653 A1 | 5/2013 |
| WO | WO-2013089404 A1 | 6/2013 |
| WO | WO-2015031323 A1 | 3/2015 |
| WO | WO-2015076917 A1 | 5/2015 |
| WO | WO-2015076932 A1 | 5/2015 |
| WO | WO-2015077040 A1 | 5/2015 |
| WO | WO-2015077040 A8 | 5/2015 |
| WO | WO-2015077042 A1 | 5/2015 |
| WO | WO-2015077049 A1 | 5/2015 |
| WO | WO-2015077056 A1 | 5/2015 |
| WO | WO-2015077068 A1 | 5/2015 |
| WO | WO-2015077096 A1 | 5/2015 |
| WO | WO-2015077223 A1 | 5/2015 |
| WO | WO-2015130335 A1 | 9/2015 |
| WO | WO-2015130341 A1 | 9/2015 |
| WO | WO-2016010578 A1 | 1/2016 |
| WO | WO-2016010651 A1 | 1/2016 |

OTHER PUBLICATIONS

U.S. Appl. No. 15/052,600, filed Feb. 24, 2016, Wireless Apparatus for High-Efficiency (HE) Communication With Additional Subcarriers.

U.S. Appl. No. 14/447,254, filed Jul. 30, 2014, Master Station and Method for High-Efficiency Wi-Fi (HEW) Communication With a Minimum OFDMA Bandwidth Unit.

U.S. Appl. No. 15/113,214, filed Jul. 21, 2016, Uplink or Downlink MU-MIMO Apparatus and Method.

U.S. Appl. No. 14/304,041 now U.S. Pat. No. 9,271,241, filed Jun. 13, 2014, Access Point and Methods for Distinguishing HEW Physical Layer Packets With Backwards Compatibility.

U.S. Appl. No. 14/977,405, filed Dec. 21, 2015, High-Efficiency Station (STA) and Method for Decoding an HE-PPDU (as Amended).

U.S. Appl. No. 14/315,562, filed Jun. 26, 2014, Transmit Time Offset in Uplink Multi-User Multiple Input-Multiple Output System.

U.S. Appl. No. 14/341,055, filed Jul. 25, 2014, HEW Master Station and Method for Communicating in Accordance With a Scheduled OFDMA Technique on Secondary Channels.

U.S. Appl. No. 14/458,000, filed Aug. 12, 2014, Master Station and Method for HEW Communication Using a Transmission Signaling Structure for a HEW Signal Field.

U.S. Appl. No. 15/025,634, filed Mar. 29, 2016, HEW Communication Station and Method for Communicating Longer Duration OFDM Symbols Using Minimum Bandwidth Units Having Tone Allocations.

U.S. Appl. No. 14/563,406, filed Dec. 8, 2014, High-Efficiency Wireless Local-Area Network Devices and Methods for Acknowledgements During Scheduled Transmission Opportunities.

U.S. Appl. No. 15/026,022, filed Mar. 30, 2016, Method, Apparatus, and Computer Readable Medium for Multi-User Scheduling in Wireless Local-Area Networks.

11ah Preamble for 2Mhz and Beyond, IEEE Submission No. IEEE 802.1-11/1483r2, 1-24.

"U.S. Appl. No. 14/341,055, Non Final Office Action dated Nov. 14, 2016", 10 pgs.

"U.S. Appl. No. 14/447,254, Examiner Interview Summary dated Jul. 22, 2016", 4 pgs.

"U.S. Appl. No. 14/447,254, Final Office Action dated Sep. 14, 2016", 13 pgs.

"U.S. Appl. No. 14/447,254, Response filed Aug. 1, 2016 to Non Final Office Action dated Mar. 31, 2016", 12 pgs.

"U.S. Appl. No. 14/458,000, Notice of Allowance dated Aug. 24, 2016", 11 pgs.

"U.S. Appl. No. 14/458,000, Response filed Aug. 8, 2016 to Final Office Action dated May 9, 2016", 12 pgs.

"U.S. Appl. No. 14/563,406, Final Office Action dated Aug. 9, 2016", 15 pgs.

(56) References Cited

OTHER PUBLICATIONS

"U.S. Appl. No. 14/563,406, Response filed Jan. 9, 2017 to Final Office Action dated Aug. 9, 2016", 9 pgs.
"U.S. Appl. No. 14/563,406, Response filed Jul. 26, 2016 to Non Final Office Action dated Apr. 26, 2016", 9 pgs.
"U.S. Appl. No. 14/977,405, Final Office Action dated Aug. 24, 2016", 8 pgs.
"U.S. Appl. No. 14/977,405, Notice of Allowance dated Nov. 18, 2016", 8 pgs.
"U.S. Appl. No. 14/977,405, Response filed Oct. 24, 2016 to Final Office Action dated Aug. 24, 2016", 11 pgs.
"U.S. Appl. No. 15/052,600, Corrected Notice of Allowance dated Aug. 5, 2016", 7 pgs.
"European Application Serial No. 14863362.1, Response filed Dec. 20, 2016 to Communication pursuant to Rules 161(2) and 162 EPC dated Jun. 28, 2016", 21 pgs.
"European Application Serial No. 16168650.6, Extended European Search Report dated Sep. 7, 2016", 12 pgs.
"Indian Application Serial No. 201647013626, Voluntary Amendment filed Aug. 4, 2016", W/English Translation, 15 pgs.
"Indian Application Serial No. 201647013653, Preliminary Amendment filed Aug. 8, 2016", W/English Translation, 18 pgs.
"Indian Application Serial No. 201647039642, Preliminary Amendment filed Jan. 5, 2017", 5 pgs.
"International Application Serial No. PCT/US2014/044881, International Preliminary Report on Patentability dated Sep. 9, 2016", 9 pgs.
"Taiwanese Application Serial No. 104101790, Response filed Jul. 22, 2016 to Office Action dated Apr. 21, 2016", W/ English Claims, 10 pgs.
"Taiwanese Application Serial No. 104106272, Response filed Oct. 14, 2016 to Office Action dated Apr. 18, 2016", W/ English Claims, 45 pgs.
"Taiwanese Application Serial No. 104106275, Response filed Sep. 6, 2016 to Office Action dated Jun. 8, 2016", W/ English Claims, 80 pgs.
"Taiwanese Application Serial No. 104108807, Response filed Nov. 25, 2016 Office Action dated May 26, 2016", W/ English Claims, 65 pgs.
"Taiwanese Application Serial No. 104110914, Response filed Sep. 10, 2016 to Office Action dated Mar. 28, 2016", W/ English Translation of Claims, 98 pgs.
"Taiwanese Application Serial No. 104113863, Response filed Aug. 30, 2016 to Office Action dated Jun. 6, 2016", W/ English Claims, 76 pgs.
"Taiwanese Application Serial No. 104117983, Office Action dated Jul. 28, 2016", 5 pgs.
"Taiwanese Application Serial No. 104118504, Office Action dated Jul. 21, 2016", W/ English Translation, 18 pgs.
"Taiwanese Application Serial No. 104118504, Response filed Oct. 18, 2016 to Office Action dated Jul. 21, 2016", W/ English Claims, 104 pgs.
"Taiwanese Application Serial No. 104122567, Office Action dated Oct. 13, 2016", W/ English Search Report, 8 pgs.
"Taiwanese Application Serial No. 105113980, Office Action dated Jul. 21, 2016", W/ English Claims, 18 pgs.
"Taiwanese Application Serial No. 105113980, Response filed Oct. 24, 2016 to Office Action dated Jul. 21, 2016", W/ English Claims, 80 pgs.
"(Discussion on potential techniques for HEW", IEEE 802.11-13/0871 rO), (Jul. 15, 2013), 13 pgs.
"11 ah Preamble for 2Mhz and Beyond", IEEE Submission No. IEEE 802.1-11/1483r2, 1-24.
"U.S. Appl. No. 14/304,041, Notice of Allowance dated Oct. 8, 2015", 8 pgs.
"U.S. Appl. No. 14/304,041, Supplemental Notice of Allowability dated Nov. 4, 2015", 5 pgs.
"U.S. Appl. No. 14/315,562, Examiner Interview Summary dated Jun. 20, 2016", 2 pgs.
"U.S. Appl. No. 14/315,562, Final Office Action dated Mar. 21, 2016", 16 pgs.
"U.S. Appl. No. 14/315,562, Non Final Office Action dated Sep. 25, 2015", 14 pgs.
"U.S. Appl. No. 14/315,562, Notice of Allowability dated Jun. 20, 2016", 7 pgs.
"U.S. Appl. No. 14/315,562, Notice of Allowance dated Jun. 6, 2016", 12 pgs.
"U.S. Appl. No. 14/315,562, Response filed May 16, 2016 to Final Office Action dated Mar. 21, 2016", 10 pgs.
"U.S. Appl. No. 14/315,562, Response filed Dec. 28, 2015 to Non Final Office Action dated Sep. 25, 2015", 9 pgs.
"U.S. Appl. No. 14/338,137, Corrected Notice of Allowance dated Jan. 22, 2016", 10 pgs.
"U.S. Appl. No. 14/338,137, Notice of Allowance dated Nov. 25, 2015", 14 pgs.
"U.S. Appl. No. 14/447,254, Non Final Office Action dated Mar. 31, 2016", 13 pgs.
"U.S. Appl. No. 14/458,000, Final Office Action dated May 9, 2016", 11 pgs.
"U.S. Appl. No. 14/458,000, Non Final Office Action dated Dec. 3, 2015", 16 pgs.
"U.S. Appl. No. 14/458,000, Response filed Mar. 3, 2015 to Non Final Office Action dated Dec. 3, 2015", 15 pgs.
"U.S. Appl. No. 14/563,406, Non Final Office Action dated Apr. 26, 2016", 12 pgs.
"U.S. Appl. No. 14/977,405, Examiner Interview Summary dated Jul. 25, 2016", 3 pgs.
"U.S. Appl. No. 14/977,405, Non Final Office Action dated Feb. 26, 2016", 7 pgs.
"U.S. Appl. No. 14/977,405, Preliminary Amendment filed Dec. 22, 2015", 11 pgs.
"U.S. Appl. No. 14/977,405, Response filed Jul. 20, 2016 to Non Final Office Action dated Feb. 26, 2016", 11 pgs.
"U.S. Appl. No. 15/052,600, Corrected Notice of Allowance dated Jun. 24, 2016", 7 pgs.
"U.S. Appl. No. 15/052,600, Notice of Allowance dated May 20, 2016", 10 pgs.
"U.S. Appl. No. 15/052,600, Preliminary Amendment filed Apr. 1, 2016", 10 pgs.
"Guard interval estimation considering switch time and propagation delay", R1-134362, 3GPP TSG RAN WG1 Meeting #74bis, (Oct. 2013).
"International Application Serial No. PCT/US2014/044881, International Search Report dated Nov. 24, 2014", 3 pgs.
"International Application Serial No. PCT/US2014/044881, Written Opinion dated Nov. 24, 2014", 7 pgs.
"International Application Serial No. PCT/US2014/053451, International Search Report dated Dec. 10, 2014", 3 pgs.
"International Application Serial No. PCT/US2014/053451, Written Opinion dated Dec. 10, 2014", 4 pgs.
"International Application Serial No. PCT/US2014/055996, International Preliminary Report on Patentability dated Jun. 2, 2016", 7 pgs.
"International Application Serial No. PCT/US2014/057751, International Preliminary Report on Patentability dated Jun. 2, 2016", 7 pgs.
"International Application Serial No. PCT/US2014/057751, International Search Report dated Jan. 5, 2015", 3 pgs.
"International Application Serial No. PCT/US2014/057751, Written Opinion dated Jan. 5, 2015", 5 pgs.
"International Application Serial No. PCT/US2014/064340, International Preliminary Report on Patentability dated Jun. 2, 2016", 8 pgs.
"International Application Serial No. PCT/US2014/064340, International Search Report dated Feb. 16, 2015", 3 pgs.
"International Application Serial No. PCT/US2014/064340, Written Opinion dated Feb. 16, 2015", 6 pgs.
"International Application Serial No. PCT/US2014/064350, International Preliminary Report on Patentability dated Jun. 2, 2016", 7 pgs.
"International Application Serial No. PCT/US2014/064350, International Search Report dated Feb. 6, 2015", 4 pgs.

(56) References Cited

OTHER PUBLICATIONS

"International Application Serial No. PCT/US2014/064350, Written Opinion dated Feb. 6, 2015", 5 pgs.
"International Application Serial No. PCT/US2014/064509, International Preliminary Report on Patentability dated Jun. 2, 2016", 10 pgs.
"International Application Serial No. PCT/US2014/064509, International Search Report dated Feb. 11, 2015", 3 pgs.
"International Application Serial No. PCT/US2014/064509, Written Opinion dated Feb. 11, 2015", 8 pgs.
"International Application Serial No. PCT/US2014/064599, International Preliminary Report on Patentability dated Jun. 2, 2016", 9 pgs.
"International Application Serial No. PCT/US2014/064599, International Search Report dated Feb. 26, 2015", 3 pgs.
"International Application Serial No. PCT/US2014/064599, Written Opinion dated Feb. 26, 2015", 7 pgs.
"International Application Serial No. PCT/US2014/064767, International Preliminary Report on Patentability dated Jun. 2, 2016", 10 pgs.
"International Application Serial No. PCT/US2014/064767, International Search Report dated Feb. 26, 2015", 8 pgs.
"International Application Serial No. PCT/US2014/064767, Written Opinion dated Feb. 26, 2015", 8 pgs.
"International Application Serial No. PCT/US2014/065166, International Search Report dated Jan. 22, 2015", 3 pgs.
"International Application Serial No. PCT/US2014/065166, Written Opinion dated Jan. 22, 2015", 6 pgs.
"International Application Serial No. PCT/US2014/066133, International Preliminary Report on Patentability dated Jun. 2, 2016", 9 pgs.
"International Application Serial No. PCT/US2014/066133, International Search Report dated Feb. 24, 2015", 3 pgs.
"International Application Serial No. PCT/US2014/066133, Written Opinion dated Feb. 24, 2015", 7 pgs.
"International Application Serial No. PCT/US2014/071942, International Search Report dated Apr. 17, 2015", 3 pgs.
"International Application Serial No. PCT/US2014/071942, Written Opinion dated Apr. 17, 2015", 7 pgs.
"International Application Serial No. PCT/US2015/035114, International Search Report dated Oct. 19, 2015", 3 pgs.
"International Application Serial No. PCT/US2015/035114, Written Opinion dated Oct. 19, 2015", 8 pgs.
"Taiwanese Application Serial No. 104101790, Office Action dated Apr. 21, 2016", w/ English Claims, 12 pgs.
"Taiwanese Application Serial No. 104106272, Office Action dated Apr. 18, 2016", w/ English Claims, 15 pgs.
"Taiwanese Application Serial No. 104106275, Office Action dated Jun. 8, 2016", 3 pgs.
"Taiwanese Application Serial No. 104108803, Office Action dated Jul. 1, 2016", 4 pgs.
"Taiwanese Application Serial No. 104108807, Office Action dated May 26, 2016", W/ English Search Report, 10 pgs.
"Taiwanese Application Serial No. 104110914, Office Action dated Mar. 28, 2016", w/ English Claims, 14 pgs.
"Taiwanese Application Serial No. 104113863, Office Action dated Jun. 6, 2016", 5 pgs.
"VHDL Implementation of Reconfigurable Multimode Block Interleaver for OFDM Based WLAN", IJARECE, vol. 1, [Online]. Retrieved from the Internet: <http://ijarece.org/>, (Oct. 2012), 82-84 pgs.
Choi, Jinsoo, "Discussion on OFDMA in HEW", In: IEEE P802.11—High Efficiency WLAN Study Group, (Nov. 11, 2013), 11 pgs.
Chun, Jinyoung, et al., "Legacy Support on HEW frame structure", IEEE 11-13/1057r0, (Sep. 16, 2013), 8 pgs.
Chun, Jinyoung, et al., "Uplink multi-user transmission", In: IEEE P802.11—High Efficiency WLAN Study Group, (Nov. 11, 2013), 18 pgs.
Hiertz, Guido R, et al., "Proposed direction and priorities for HEW", In: IEEE P802.11—High Efficiency WLAN Study Group, (Nov. 12, 2013), 17 pgs.
Koskela, Timo, et al., "Discussion on Potential Techniques for HEW", In: IEEE P802.11—High Efficiency WLAN Study Group, [Online] Retrieved from the Internet: <http://www.ieee802.org/11/Reports/hew_update.html>, (Jul. 15, 2013), 13 pgs.
Oh, Jinhyung, et al., "Distributed implicit interference alignment in 802.11ac WLAN network", International Conference on ICT Convergence (ICTC), (Oct. 2013), 421-426.
"U.S. Appl. No. 14/341,055, Examiner Interview Summary dated Apr. 18, 2017", 3 pgs.
"U.S. Appl. No. 14/341,055, Response filed Apr. 14, 2017 to Non Final Office Action dated Nov. 14, 2016", 11 pgs.
"U.S. Appl. No. 14/447,254, Advisory Action dated Feb. 13, 2017", 4 pgs.
"U.S. Appl. No. 14/447,254, Examiner Interview Summary dated Jan. 18, 2017", 3 pgs.
"U.S. Appl. No. 14/447,254, Response filed Jan. 17, 2017 Final Office Action dated Sep. 14, 2016", 11 pgs.
"U.S. Appl. No. 14/563,406, Advisory Action dated Jan. 23, 2017", 3 pgs.
"U.S. Appl. No. 14/563,406, Corrected Notice of Allowance dated Jun. 14, 2017", 2 pgs.
"U.S. Appl. No. 14/563,406, Examiner Interview Summary dated Jan. 18, 2017", 3 pgs.
"U.S. Appl. No. 14/563,406, Notice of Allowance dated Mar. 7, 2017", 7 pgs.
"U.S. Appl. No. 15/026,022, Non Final Office Action dated Jul. 18, 2017", 7 pgs.
"U.S. Appl. No. 15/026,022, Preliminary Amendment dated Mar. 30, 2016", 9 pgs.
"U.S. Appl. No. 15/263,864, Non Final Office Action dated Mar. 10, 2017", 4 pgs.
"U.S. Appl. No. 15/263,864, Response filed Jun. 9, 2017 to Non Final Office Action dated Mar. 10, 2017", 9 pgs.
"U.S. Appl. No. 15/280,782, Non Final Office Action dated May 12, 2017", 25 pgs.
"U.S. Appl. No. 15/394,069, Non Final Office Action dated May 26, 2017", 18 pgs.
"Chinese Application Serial No. 201580079973.7, Voluntary Amendment filed on Jun. 15, 2017", (W/ English Translation), 12 pgs.
"European Application Serial No. 14863133.6, Extended European Search Report dated Jul. 3, 2017", 10 pgs.
"European Application Serial No. 14863142.7, Extended European Search Report dated May 3, 2017", 7 pgs.
"European Application Serial No. 14863362.1, Extended European Search Report dated Jul. 18, 2017", 8 pgs.
"European Application Serial No. 14864636.7, Extended European Search Report dated Jul. 21, 2017", 8 pgs.
"European Application Serial No. 14864680.5, Extended European Search Report dated Jul. 18, 2017", 11 pgs.
"Further evaluation on outdoor Wi-Fi ; 11-13-0843-00-0hew-further-evaluation-on-outdoor-wi-fi", W00kb0ng Lee (LG Electronics): IEEE SA Mentor;11-13-0843-00-0HEW-Further-Evaluation-On-0utd00r-Wi-Fi, IEEE-SA Mentor, Piscataway, NJ USA, (Jul. 15, 2013), 18 pgs.
"HEW SG PHY Considerations for Outdoor Environment; 11-13-0536-00-0hew-hew-sg-phy-considerations-for-outdoor-environment", W00kb0ng Lee (LG Electronics): IEEE SA Mentor; 11-13-0536-00-0HEW-HEW-SG-PHY-C0nsiderations-For-Outdoor-Environment, IEEE-Samentor, Piscataway, NJ IJSA,, (May 13, 2013), 21 pgs.
"Indian Application Serial No. 201647013652, Preliminary Amendment dated Aug. 4, 2016", 11 pgs.
"International Application Serial No. PCT/US2014/071942, International Preliminary Report on Patentability dated Feb. 2, 2017", 9 pgs.
"International Application Serial No. PCT/US2015/035114, International Preliminary Report on Patentability dated Jan. 26, 2017", 10 pgs.

(56) References Cited

OTHER PUBLICATIONS

"Taiwanese Application Serial No. 104108803, Response filed Jan. 3, 2017 to Office Action dated Jul. 1, 2016", w/English Claims, 8 pgs.

"Taiwanese Application Serial No. 104117983, Response filed Jan. 16, 2017 to Office Action dated Jul. 28, 2016", (W/ English Translation), 87 pgs.

"Taiwanese Application Serial No. 104118345, Office Action dated May 10, 2017", W/ English Translation, 9 pgs.

"Taiwanese Application Serial No. 104118504, Office Action dated Apr. 21, 2017", W/English Claims, 19 pgs.

"Taiwanese Application Serial No. 104122567, Office Action dated Jun. 27, 2017", (W/ Partial English Translation), 5 pgs.

"Taiwanese Application Serial No. 104122567, Response Filed Apr. 13, 2017 to Office Action dated Oct. 13, 2016", (W/O English Claims), 9 pgs.

Jianhan, Liu, "Summary and Discussions of Proposals on Potential PHY Technologies in HEW 11-13-1375-01-0hew-summary-and-discussions-of-proposals-on-potential-phy-technologies-in-hew", IEEE Draft; 11-13-1375-01-0HEW-Summary-And-Discussions-Of-Proposals-On-Potential-PHY-Technologies-In-HEW, IEEE-SA Mentor, Piscataway, NJ USA, vol. 802.11 HEW, No. 1,, (Nov. 12, 2013), 1-15.

Jinsoo, Choi, "Discussion on OFDMA in HEW ; 11-13-1382-00-0hew-di scussion-on-ofdma-inhew", (LG Electronics): IEEE Draft; 11-13-1382-00-0HEW-Discussi0n-0n-0FDMA-In-HEW, IEEE-SA Mentor, Piscataway, NJ USA vol. 802.11 HEW, (Nov. 12, 2013), 1-11.

Raja, Banerjea, "A simplified STR Mechansim—MAC 11-14-0340-00-0hew-a-simplified-str-mechansim mac", IEEE Draft, 11-14-0340-00-OHEW-A-Simplified-STR-Mechansim-MAC, IEEE-Samentor, Piscataway, NJ USA, vol. 802.11HEW, (Mar. 16, 2014), 13 pgs.

Robert, Stacey, "Proposed Specification Framework for TGac; 11-09-0992-21-00ac-proposed-specification-framework for tgac", IEEE SA Mentor, 11-09-0992-21-00AC-Proposed-Specificationframework-For-TGAC,IEEE-Samentor, Piscataway, NJ USA, vol. 802.11ac,No. 21, (Jan. 19, 2011), 49 pgs.

Robert, Stacey, "Proposed TGac Draft Amendment ; 11-10-1361-13-00ac-proposed-tgac-draft-amendment", IEEE SA Mentor;11-1O-1361-O3-00AC-Proposed-TGAC-Draft-Amendment, IEEE-SA Mentor, Piscataway, NJUSA,, (Jan. 19, 2011), 154 pgs.

\* cited by examiner

MASTER STATION AND METHOD FOR HEW COMMUNICATION WITH SIGNAL FIELD CONFIGURATION FOR HEW OFDMA MU-MIMO WIDEBAND CHANNEL OPERATION

PRIORITY CLAIMS

This application is a U.S. National Stage Filing under 35 U.S.C. 371 from International Application No. PCT/US2014/055996, filed Sep. 17, 2014 and published in English as WO 2015/076917 on May 28, 2015, which claims the benefit of priority to the following United States Provisional Patent Applications:

Ser. No. 61/906,059, filed Nov. 19, 2013,
Ser. No. 61/973,376, filed Apr. 1, 2014,
Ser. No. 61/976,951, filed Apr. 8, 2014,
Ser. No. 61/986,256, filed Apr. 30, 2014,
Ser. No. 61/986,250, filed Apr. 30, 2014,
Ser. No. 61/991,730, filed May 12, 2014,
Ser. No. 62/013,869, filed Jun. 18, 2014,
Ser. No. 62/024,813, filed Jul. 15, 2014,
Ser. No. 61/990,414, filed May 8, 2014,
Ser. No. 62/024,801, filed Jul. 15, 2014, and
Ser. No. 62/026,277, filed Jul. 18, 2014, each of which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax SIG (named DensiFi). Some embodiments relate to high-efficiency wireless or high-efficiency WLAN (HEW) communications. Some embodiments relate to multi-user multiple-input multiple-output (MU-MIMO), orthogonal frequency division multiple access (OFDMA), PHY preambles, and signal fields (SIGs).

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). The frame structure used for conventional and legacy IEEE 802.11 communications including very-high throughput (VHT) communications may be less suitable for such high-density deployment situations. A recently-formed study group for Wi-Fi evolution referred to as the IEEE 802.11 High Efficiency WLAN (HEW) study group (SG) (i.e., IEEE 802.11ax) is addressing these high-density deployment scenarios. Once issue is that the signal field conventionally used is not suitable for efficient HEW OFDMA MU-MIMO wideband channel operation.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications that can coexist with legacy devices. There are also general needs for HEW OFDMA MU-MIMO wideband channel operation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
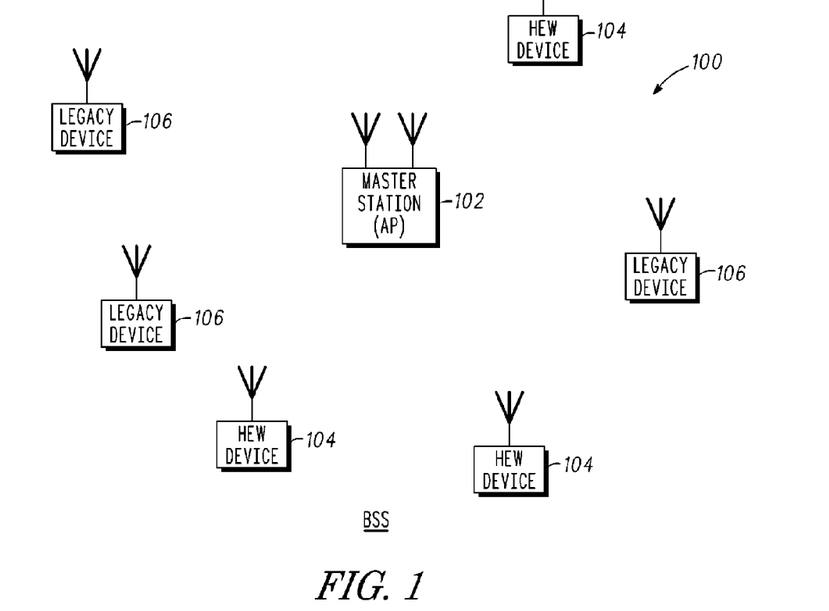
FIG. 1 illustrates a HEW network in accordance with some embodiments.

FIG. 1 illustrates a High Efficiency Wi-Fi (HEW) network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, legacy stations 106 may refrain from communicating. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with legacy stations 106 in accordance with legacy IEEE 802.11 communication techniques. In some embodiments, the master station 102 may also be configurable communicate with the HEW stations 104 outside the HEW control period in accordance with legacy IEEE 802.11 communication techniques, although this is not a requirement.

In some embodiments, the HEW communications during the control period may be configurable to have bandwidths of one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with some embodiments, the master station 102 may be configured to transmit an indication to one or more of a plurality of HEW stations 104 to indicate which one of a plurality of 20 MHz channels to monitor for a HEW signal field. The master station 102 may configure the HEW signal field to indicate which of a plurality of subchannels of the indicated 20 MHz channel is allocated to the scheduled HEW stations 104 for communication during the HEW control period. The master station 102 may transmit the configured HEW signal field in the indicated one of the 20 MHz channels and may communicate with the scheduled HEW stations 104 on the indicated subchannels during the control period in accordance with a multiple access technique, such as an OFDMA technique. The HEW signal field may include control information, among other things.

In these embodiments, the indication that indicates which one of the 20 MHz channels to monitor for the HEW signal field may a STA OFDMA grouping Information Element (IE). In some embodiments, the indication may be a STA OFDMA pre-configuration frame. In some embodiments, the HEW signal fields may be transmitted during an HEW control period (e.g., an HEW operational period) which may be a TXOP obtained by the master station 102 during which the master station 102 has exclusive control of the channel for communication with the scheduled HEW stations 104 in accordance with a scheduled OFDMA technique. The HEW stations 104 may monitor transmissions of the master station 102 during the HEW control period for the HEW signal field. These embodiments disclosed herein provide a mechanism for configuring each HEW station 104 for operation within a 20 MHz channel so that the HEW stations 104 can properly decode the HEW signal field destined for that station.

Figure 2:
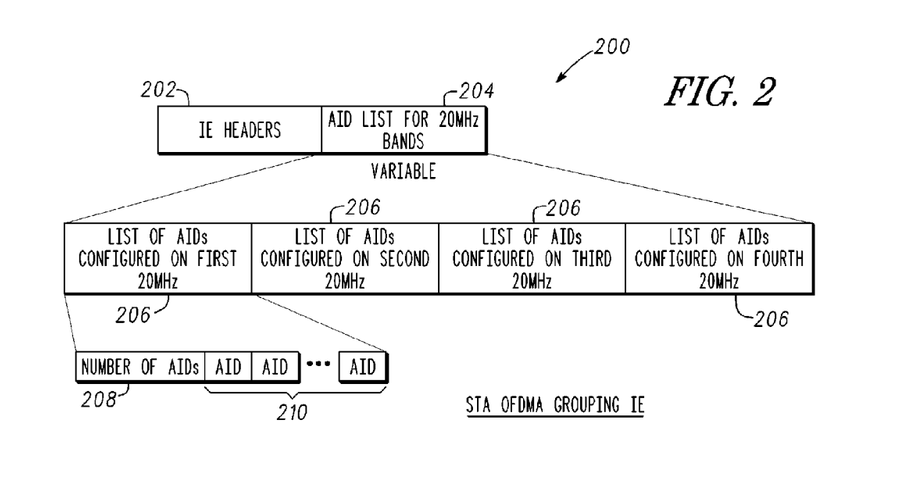
FIG. 2 illustrates a STA OFDMA grouping Information Element (IE) in accordance with some embodiment.

FIG. 2 illustrates a STA OFDMA grouping Information Element (IE) in accordance with some embodiment. STA OFDMA grouping IE 200 may be configurable to include a list (i.e., a group) of association identifiers (AIDs) for each 20 MHz channel of the plurality of 20 MHz channels. Each AID may correspond to one of the scheduled HEW stations 104.

In these embodiments, the master station 102 (FIG. 1) may transmit the STA OFDMA grouping IE 200 to one or more of the HEW stations 104 to indicate which one of a plurality of 20 MHz channels to monitor for a HEW signal field. The master station 102 may configure the HEW signal field to indicate which of the subchannels of the indicated 20 MHz channel is allocated to the HEW stations 104 for communication during a control period.

In some MU-MIMO embodiments, the list of AIDs for a particular 20 MHz channel may comprise a MU-MIMO group of stations 104. In these embodiments, the scheduled HEW stations 104 that are identified by their AID for a particular 20 MHz channel may be a MU-MIMO group and may be configured to communicate in accordance with a MU-MIMO technique on the allocated one or more subchannels during the OFDMA control period. In these MU-MIMO embodiments, multiple streams of data may be communicated simultaneously over a channel or subchannel and each scheduled station 104 may receive one or more of these separate streams. In some embodiments, single-user (SU) MIMO (SU-MIMO) techniques may be used in which a single scheduled HEW station 104 may communicate one or more streams of data over a channel or subchannel.

In some embodiments, the STA OFDMA grouping IE 200 includes the IE header field 202 followed by a variable-length AID list field 204. The variable-length AID list field 204 may be configurable to include an AID list subfield 206 for each of the 20 MHz channels. Each AID list subfield 206 may include the list of AIDs for an associated 20 MHz channel.

In some embodiments, the IE header field 202 includes an element identifier (ID) field to identify the information element as an STA OFDMA grouping IE 200 and a length field to indicate the length of the STA OFDMA grouping IE 200. In these embodiments, the element ID field may be one octet, the length field may be one octet, and the variable-length AID list field 204 (i.e., an information field) may be a variable number of octets, although the scope of the embodiments is not limited in this respect. In some embodiments, each AID list subfield 206 indicates a number of AIDs 208 in the list followed by the actual AIDs 210 in the list.

In some embodiments, the STA OFDMA grouping IE 200 may be transmitted in one of a broadcast frame, a multicast frame or a beacon and comprises a 20 MHz transmission in one of the 20 MHz channels. In some embodiments, a multicast frame may be sent to selected stations rather than all stations as in the case of a broadcast frame or beacon. A multicast frame, for example, may be sent to the HEW stations 104 that are identified by an AID in the STA OFDMA grouping IE 200, although the scope of the embodiments is not limited in this respect. In some embodiments, the OFDMA grouping IE 200 may be transmitted in accordance with legacy (i.e., contention-based) communication techniques.

In these embodiments, the HEW stations 104 may be configured to monitor one or more of the 20 MHz channels to identify and receive the STA OFDMA grouping IE 200. In some embodiments, the HEW stations 104 may be configured to monitor two or more of the 20 MHz channels (e.g., each 20 MHz channel of a 40 MHz bandwidth) to identify and receive the STA OFDMA grouping IE 200. In some embodiments, the HEW stations 104 may be configured to monitor the full channel bandwidth (e.g., each 20 MHz channel of an 80 MHz or 160 MHz bandwidth) to identify and receive a STA OFDMA grouping IE 200, although the scope of the embodiments is not limited in this respect. In some embodiments, the STA OFDMA grouping IE 200 may be transmitted on only one of the 20 MHz channels (e.g., a primary channel), although this is not a requirement as the STA OFDMA grouping IE 200 may be transmitted on more than one 20 MHz channel.

Figure 3:
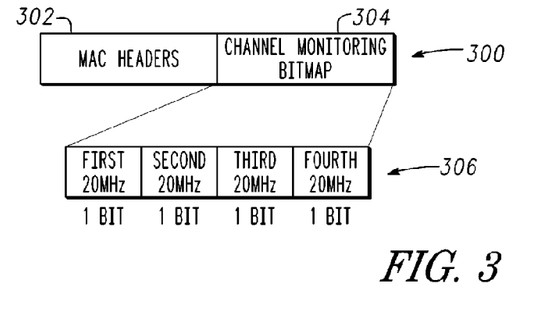
FIG. 3 illustrates a STA OFDMA pre-configuration frame in accordance with some embodiments.

FIG. 3 illustrates a STA OFDMA pre-configuration frame in accordance with some embodiments. In some embodiments, the indication that is transmitted to indicate which one of a plurality of 20 MHz channels to monitor for a HEW signal field is an STA OFDMA pre-configuration frame 300. The STA OFDMA pre-configuration frame 300 may be configured for unicast transmission (i.e., transmitted to a particular HEW station 104) and may comprise a channel monitoring bitmap 304 that indicates one of a plurality of the 20 MHz channels.

In some embodiments, the channel monitoring bitmap 304 may be configured to indicate to one of the scheduled HEW stations 104, which of the 20 MHz channels to monitor for a subsequent HEW signal field. In some embodiments, the STA OFDMA pre-configuration frame 300 may be a medium-access control (MAC) management frame. In some of these embodiments, the OFDMA pre-configuration frame 300 may be transmitted on a subchannel being monitored by the particular HEW station 104, although the scope of the embodiments is not limited in this respect. These embodiments are discussed in more detail below.

In the example illustrated in FIG. 3, the channel monitoring bitmap 304 is shown as having four bits, the first bit representing the first 20 MHz channel, the second bit representing the second 20 MHz channel, the third bit representing the third 20 MHz channel and the forth bit representing the forth 20 MHz channel. In embodiments that utilize additional 20 MHz channels, larger bitmaps may be used.

Figure 4:
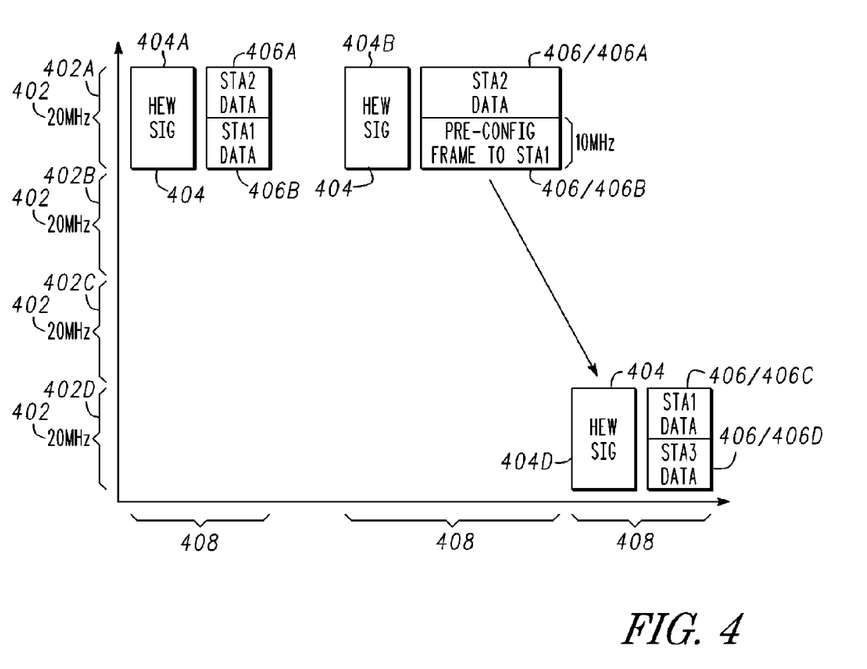
FIG. 4 illustrates examples of signal field transmissions and indicated OFDMA subchannels in accordance with some embodiments.

FIG. 4 illustrates examples of signal field transmissions and indicated OFDMA subchannels in accordance with some embodiments. In these embodiments, a master station 102 (FIG. 1) may transmit a STA OFDMA grouping IE 200 (FIG. 2) to one or more of a plurality of HEW stations 104 to indicate which one of a plurality of 20 MHz channels 402 to monitor for a HEW signal field 404. The master station 102 may configure the HEW signal field 404 to indicate which of a plurality of OFDMA subchannels 406 of the indicated 20 MHz channel 402 is allocated to the scheduled HEW stations 104 for communication during an HEW control period 408. The master station 102 may also transmit the configured HEW signal field 404 in the indicated one of the 20 MHz channels 402 and communicate with the scheduled HEW stations 104 on the indicated subchannels 406 during the control period 408 in accordance with OFDMA technique. The HEW signal fields 404 may be transmitted during an HEW control period 408. The control period 408 (e.g., an HEW operational period) may be a TXOP obtained by the master station 102 during which the master station 102 has exclusive control of the channel for communication with the HEW stations in accordance with a scheduled OFDMA technique. The HEW stations 104 may monitor transmissions of the master station 102 during the HEW control period 408 for the HEW signal field 404.

As illustrated in FIG. 4, STA 1 and STA 2 (i.e., HEW stations 104) may receive a STA OFDMA grouping IE 200 (FIG. 2) indicating that STA 1 and STA 2 are part of the same MU-MIMO group and that STA 1 and STA 2 are to monitor channel 402A for HEW SIG 404A. The HEW SIG 404A may indicate that STA 2 is to communicate on subchannel 406A and that STA 1 is to communicate on subchannel 406B. The HEW SIG 404A may also include other control information.

Although FIG. 4 illustrates subchannels 406 having a 10 MHz bandwidth, subchannels 406 of other bandwidths may also be used. Furthermore, although FIG. 4 illustrates a MU-MIMO group of only two stations (i.e., STA 1 and STA 2) communicating after each HEW signal field 404, the scope of the embodiments is not limited in this respect as a MU-MIMO group may include many stations configured to communicate on one or more of the subchannels 406.

In some embodiments, a channel monitoring bitmap 304 of a STA OFDMA pre-configuration frame 300 may indicate to an HEW station 104 to switch to another channel 402D (i.e., STA 1 from channel 402A to 402D) to receive OFDMA configuration information from an HEW signal field 404D that is to be subsequently transmitted on the other channel (i.e., channel 402D). In these embodiments, when the STA OFDMA pre-configuration frame 300 is transmitted to a particular HEW station 104 (i.e., unicast), there may be a need for that HEW station 104 to switch to another channel 402. In these embodiments, the STA OFDMA pre-configuration frame 300 may be transmitted on subchannel 406B after transmission of a prior HEW signal field 404 (e.g., HEW signal field 404B) that may have indicated to the HEW station 104 (e.g., STA 1) to communicate on that particular subchannel 406B.

For example, STA 1 and STA 2 may receive a STA OFDMA grouping IE 200 indicating to STA 1 and STA 2 to monitor channel 402A for HEW SIG 404A. As illustrated in FIG. 4, the HEW SIG 404A may indicate that STA 2 is to communicate on subchannel 406A and that STA 1 is to communicate on subchannel 406B. STA 1 and STA 2 may continue to monitor channel 402A to receive HEW SIG 404B. The HEW SIG 404B may indicate that STA 2 is to communicate on subchannel 406A and that STA 1 is to communicate on subchannel 406B. In the example illustrated in FIG. 4, STA 1 may receive a STA OFDMA pre-configuration frame 300 on subchannel 406B and may be instructed to switch to channel 402D to receive HEW signal field 404D which may provide the configuration information for receiving data on a subchannel, such as subchannel 406C as shown.

In the example illustrated in FIG. 4, STA 3 and STA 1 are to monitor channel 402D to receive HEW signal field 404D. STA 3 and STA 1 may be part of the same MU-MIMO group at this time. HEW signal field 404D may indicate to STA 1 to communicate on subchannel 406C and may indicate to STA 3 to communicate on subchannel 406D. In this example, STA 3 may have received a STA OFDMA grouping IE 200 indicating to STA 3 to monitor channel 402D for HEW SIG 404D. In this example, STA 1 may have received a STA OFDMA pre-configuration frame 300 on subchannel 406B to switch to channel 402D to receive HEW signal field 404D.

In some embodiments, the channel monitoring bitmap 304 (FIG. 3) may comprise a bit 306 for each of the 20 MHz channels 402. The master station 102 may be configured to set one or more of the bits 306 to indicate which of the 20 MHz channels 402 the indicated HEW station 104 is to monitor for an HEW signal field 404.

In some embodiments, the STA OFDMA pre-configuration frame 300 may comprise a transmission on a subchannel (i.e., subchannel 406B) that was indicated in the (i.e., a prior) HEW signal field 404 (i.e., HEW SIG 404B). In some embodiments, the OFDMA subchannels 406 have predefined bandwidths of one or more of 1 MHz, 2.5 MHz, 5 MHz and 10 MHz. In some embodiments, subchannels 406 may have a predefined bandwidth 4.375 MHz or multiples thereof.

During an HEW control period 408, the master station 102 is configured to receive uplink OFDMA transmissions (e.g., data) from the scheduled HEW stations 104 in accordance with an uplink multiplexing technique (e.g., SDMA) on the indicated subchannels 406. During the control period 408, the master station 102 may also be configured to transmit downlink transmissions (e.g., data) to the scheduled HEW stations 104 in accordance with a downlink multiplexing technique on the indicated subchannels 406.

In some embodiments, an HEW station 104 may be configured to receive a STA OFDMA grouping IE 200 from the master station 102 that indicates which one of a plurality of 20 MHz channels 402 to monitor for a HEW signal field 404. The HEW station 104 may monitor the indicated 20 MHz channel 402 for the HEW signal field 404 and may determine from the HEW signal field 404 which of a plurality of subchannels 406 of the indicated 20 MHz channel 402 is allocated for communication during a control period 408. The HEW station 104 may communicate with the master station 102 on the indicated one or more subchannels 406 during the control period 408 in accordance with an OFDMA technique.

In some embodiments, the HEW station 104 may be further configured to receive a STA OFDMA pre-configuration frame 300 on the indicated subchannel during the control period 408. The HEW station 104 may continue to monitor or switch to the channel 402 indicated by the channel monitoring bitmap 304 for determining OFDMA configuration information from an HEW signal field that is to be subsequently transmitted on the channel.

In some embodiments, a first step may include transmitting a STA OFDMA grouping IE 200 in broadcast frame like the beacon frame or a multicast frame. The STA OFDMA grouping IE 200 may be formatted as illustrated in FIG. 2, although the scope of the embodiments is not limited in this respect. These embodiments may be similar to the grouping of downlink MU-MIMO group where devices are to monitor a group transmission which may or may not contain data destined for them. In accordance with these embodiments, HEW stations 104 may be grouped to different 20 MHz channels (i.e., bands) and individual HEW stations 104 may be grouped into more than one of the 20 MHz channels. The OFDMA transmission may not necessarily carry the data for all the devices that are configured on the particular 20 MHz channel.

In some of these embodiments, when the STA OFDMA grouping IE 200 is carried in beacon, an HEW station 104 may only need to wake up to receive a beacon in order to know the particular 20 MHz channel it needs to monitor for a signal field 404. These embodiments, for example, may help reduce power consumption.

In a second step, a MAC management frame, such as the STA OFDMA pre-configuration frame 300 (FIG. 3), may be transmitted. As mentioned above, the STA OFDMA pre-configuration frame 300 may be a unicast frame and may require an acknowledge (ACK) from the HEW station 104, although the scope of the embodiments is not limited in this respect. In some embodiments, the channel monitoring bitmap 304 may be used to indicate to an HEW station 104 which 20 MHz channel contains the OFDMA configuration information that the HEW station 104 needs to monitor. For example, a bit may be set to 1 if the HEW station 104 needs to monitor the SIG field sent in this 20 MHz and 0 otherwise. For a 40 MHz channel, the first two bits may be used and the last two bits are reserved since there are only two 20 MHz channels that need to be identified.

As illustrated in FIG. 4, STA 1 is originally listening for HEW SIG 404A on the 1st 20 MHz channel 402A and may be configured to decode its packet on the subchannel assigned to it (i.e., OFDMA subchannel 406B). STA 1 may receive an STA OFDMA pre-configuration frame 300 on subchannel 406B after HEW SIG 404B. The STA OFDMA pre-configuration frame 300 may indicate that STA 1 should switch to the 4th 20 MHz channel 402D for decoding HEW SIG 404D. STA 1 may then switch to receiving the 4th 20 MHz channel 402D to receive HEW SIG 404D and decodes its packet on one of the subchannels (i.e., OFDMA subchannel 406D) as indicated by HEW SIG 404D.

In some embodiments, the HEW stations 104 may monitor a HEW signal field 404 for information regarding the specific sub-channel and spatial allocation for transmission. The HEW station 104 may also decode data based on scheduling information contained in the HEW signal field 404 of the specified 20 MHz channel 402. If an HEW station 104 receives a STA OFDMA pre-configuration frame 300 that indicates switching or the need to monitor additional 20 MHz channels, the HEW station 104 may switch to the specified 20 MHz channel 402 for decoding the HEW signal field 404.

Figure 5:
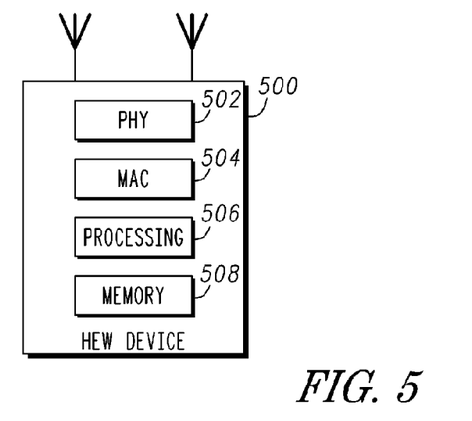
FIG. 5 is a function block diagram of an HEW station in accordance with some embodiments.

FIG. 5 is a function block diagram of an HEW station in accordance with some embodiments. HEW station 500 may be an HEW compliant device that may be arranged to communicate with one or more other HEW stations, such as HEW stations 104 (FIG. 1) or master station 102 (FIG. 1), as well as communicate with legacy devices. HEW station 500 may be suitable for operating as master station 102 (FIG. 1) or an HEW station 104 (FIG. 1). In accordance with embodiments, HEW station 500 may include, among other things, physical layer (PHY) circuitry 502 and medium-access control layer circuitry (MAC) 504. PHY 502 and MAC 504 may be HEW compliant layers and may also be compliant with one or more legacy IEEE 802.11 standards. PHY 502 may be arranged to transmit and receive HEW frames and may also include other processing circuitry 506 and memory 508 configured to perform the various operations described herein.

In accordance with some embodiments, the MAC 504 may be arranged to contend for a wireless medium during a contention period to receive control of the medium for a TXOP such as the HEW control period 408 and configure an HEW frame. The PHY 502 may be arranged to transmit the HEW frame including an HEW signal field 404, as discussed above. The PHY 502 may also be arranged to transmit and receive data from HEW stations. MAC 504 may also be arranged to perform transmitting and receiving operations through the PHY 502. The PHY 502 may include circuitry for modulation/demodulation, upconversion/downconversion, filtering, amplification, etc. In some embodiments, the processing circuitry 506 may include one or more processors. In some embodiments, two or more antennas may be coupled to the physical layer circuitry arranged for sending and receiving signals including transmission of the HEW frame. The physical layer circuitry may include one or more radios for communication in accordance with cellular (e.g., LTE) and WLAN (e.g., IEEE 802.11) techniques. The memory 508 may be store information for configuring the processing circuitry 506 to perform operations for configuring and transmitting HEW frames and performing the various operations described herein.

In some embodiments, the HEW station 500 may be configured to communicate using OFDM communication signals over a multicarrier communication channel. In some embodiments, HEW station 500 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW station 500 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW station 500 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW station 500 may include one or more of a keyboard, a display, a non-volatile memory port, multiple antennas, a graphics processor, an application processor, speakers, and other mobile device elements. The display may be an LCD screen including a touch screen.

The antennas of HEW station 500 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW station 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 6:
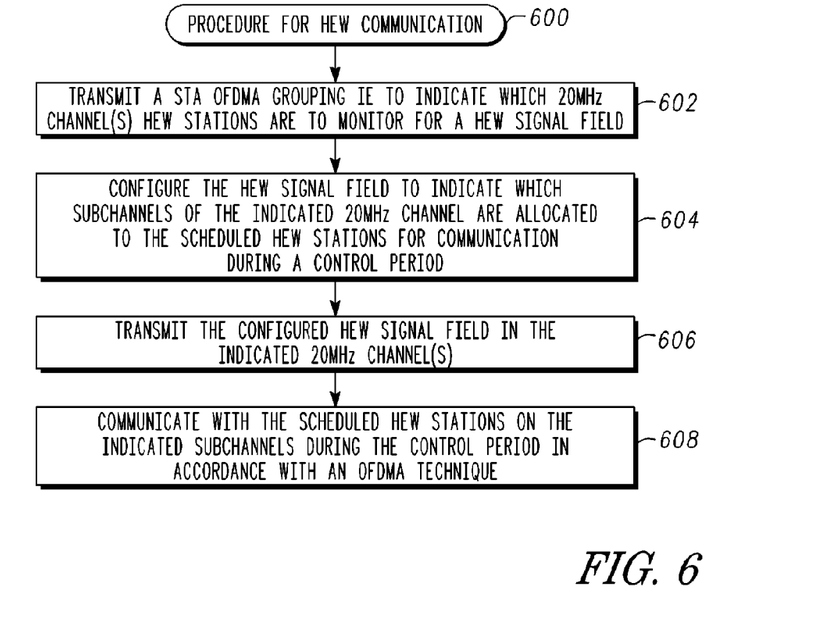
FIG. 6 is a procedure for HEW communication in accordance with some embodiments.

FIG. 6 is a procedure for HEW communication in accordance with some embodiments. Procedure 600 may be performed master station 102 configured for HEW communication in accordance with an IEEE 802.11ax technique. In operation 602, the master station 102 may transmit an indication to one or more of a plurality of HEW stations 104 to indicate which one of a plurality of 20 MHz channels 402 to monitor for a HEW signal field 404.

In operation 604, the master station 102 may configure the HEW signal field 404 to indicate which of a plurality of subchannels 406 of the indicated 20 MHz channel 402 is allocated to the scheduled HEW stations 104 for communication during an HEW control period 408.

In operation 606, the master station 102 may transmit the configured HEW signal field 404 in the indicated one of the 20 MHz channels.

In operation 608, the master station 102 may communicate with the scheduled HEW stations 104 on the indicated subchannels 406 during the control period 408 in accordance with an orthogonal-frequency divisional multiple access (OFDMA) technique. In some embodiments, a MU-MIMO OFDMA technique may be used for communicating with the scheduled stations 104 on the indicated subchannels 406. In some embodiments, the subchannels 406 may be OFDMA subchannels.

In these embodiments, the indication transmitted in operation 602 may a STA OFDMA grouping IE 200. In some embodiments, the indication may be a STA OFDMA pre-configuration frame 300 transmitted within an OFDMA subchannel to an HEW station 104.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a master station configured for high-efficiency (HE) wireless local area network (WLAN) communication, the apparatus comprising: memory; and, circuitry coupled to the memory, the circuitry configured to:
   configure the master station to transmit an indication to one or more of a plurality of HE stations to indicate which one of a plurality of 20 MHz channels to monitor for a HE signal field;
   configure the HE signal field to indicate which of a plurality of subchannels of the indicated 20 MHz channel is allocated to the HE stations for communication;
   configure the master station to transmit the configured HE signal field in the indicated one of the 20 MHz channels; and
   communicate with the HE stations on the indicated subchannels in accordance with an orthogonal-frequency divisional multiple access (OFDMA) technique.

2. The apparatus of the master station of claim 1 wherein, the indication is a station (STA) OFDMA grouping information element (IE) which is configurable to include a list of association identifiers (AIDS) for each 20 MHz channel of the plurality of 20 MHz channels; each AID corresponding to one of the HE stations.

3. The apparatus of the master station of claim 2 wherein, the list of AIDs for a particular 20 MHz channel comprises a multi-user (MU) multiple-input multiple-output (MIMO) (MU-MIMO) group of the HE stations, and
wherein the master station is configured to communicate with the HEW stations on the indicated subchannels using a MU-MIMO OFDMA technique.

4. The apparatus of the master station of claim 3 wherein, the STA OFDMA grouping IE includes an information element (IE) header field followed by a variable-length AID list field, the variable-length AID list field configurable to include a AID list subfield for each of the 20 MHz channels, wherein each AID list subfield includes the list of AIDs for an associated one of the 20 MHz channels.

5. The apparatus of the master station of claim 4 wherein, the IE header field includes an element identifier (ID) field to identify the information element as the STA OFDMA grouping IE and a length field to indicate a length of the STA OFDMA grouping IE.

6. The apparatus of the master station of claim 4 wherein, each AID list subfield indicates a number of AIDs in the list followed by the AIDs in the list.

7. The apparatus of the master station of claim 2 wherein, the STA OFDMA grouping IE is transmitted in one of a broadcast frame, a multicast frame or a beacon and comprises a transmission in one of the 20 MHz channels.

8. The apparatus of the master station of claim 1 wherein, the indication that is transmitted to indicate which one of a plurality of 20 MHz channels to monitor for the HE signal field is a station (STA) OFDMA pre-configuration frame configured for unicast transmission and comprises a channel monitoring bitmap that indicates one of a plurality of the 20 MHz channels.

9. The apparatus of the master station of claim 8 wherein, the channel monitoring bitmap indicates to an HE station to switch to another 20 MHz channel for determining OFDMA configuration information from an HE signal field that is to be subsequently transmitted on the other 20 MHz channel.

10. The apparatus of the master station of claim 9, wherein the channel monitoring bitmap comprises a bit for each of the 20 MHz channels, wherein the master station is configured to set one or more of the bits to indicate which of the 20 MHz channels the indicated HE station is to monitor for the HE signal field,
wherein the STA OFDMA pre-configuration frame comprises a transmission within one of the subchannels, and
wherein the subchannels comprise OFDMA subchannels.

11. The apparatus of the master station of claim 10, the apparatus further comprising transceiver circuitry coupled to the memory; and, one or more antennas coupled to the transceiver circuitry.

12. The master station of claim 1 wherein, the subchannels have predefined bandwidths of one or more of 1 MHz, 2.5 MHz, 5 MHz and 10 MHz,
wherein during a HE control period, the master station is configured to:
receive uplink OFDMA transmissions from the HE stations in accordance with an uplink multiplexing technique on the indicated subchannels, and/or
transmit downlink transmissions to the HE stations in accordance with a downlink multiplexing technique on the indicated subchannels.

13. A method performed by an apparatus of a master station configured for high-efficiency (HE) wireless local area network (WLAN) WLAN (HEW) communication, the method comprising:
transmitting an indication to one or more of a plurality of HE stations to indicate which one of a plurality of 20 MHz channels to monitor for a HE signal field;
configuring the HE signal field to indicate which of a plurality of subchannels of the indicated 20 MHz channel is allocated to the HE stations for communication;
transmitting the configured HE signal field in the indicated one of the 20 MHz channels; and
communicating with the HE stations on the indicated subchannels in accordance with an orthogonal-frequency divisional multiple access (OFDMA) technique.

14. The method of claim 13 wherein, the indication is a station (STA) OFDMA grouping information element (IE) which is configurable to include a list of association identifiers (AIDS) for each 20 MHz channel of the plurality of 20 MHz channels, each AID corresponding to one of the HE stations,
wherein the list of MIN for a particular 20 MHz channel comprises a multi-user (MU) multiple-input multiple-output (MIMO) (MU-MIMO) group of stations, and
wherein the method further comprises communicating with the HE stations on the indicated subchannels using a MU-MIMO OFDMA technique.

15. The method of claim 14 wherein the indication that is transmitted to indicate which one of a plurality of 20 MHz channels to monitor for a HE signal field is a STA OFDMA pre-configuration frame configured for unicast transmission and comprises a channel monitoring bitmap that indicates one of a plurality of the 20 MHz channels.

16. A non-transitory computer-readable storage medium that stores instructions for execution by one or more processors of a master station to perform operations, the operations to configure the one or more processors for:
transmitting an indication to one or more of a plurality of HE stations to indicate which one of a plurality of 20 MHz channels to monitor for a HEW signal field;
configuring the HEW signal field to indicate which of a plurality of subchannels of the indicated 20 MHz channel is allocated to the HEW stations for communication;
transmitting the configured HEW signal field in the indicated one of the 20 MHz channels; and
communicating with the HEW stations on the indicated subchannels in accordance with an orthogonal-frequency divisional multiple access (OFDMA) technique.

17. The non-transitory computer-readable storage medium of claim 16 wherein the indication is a station (STA) OFDMA grouping information element (IE) which is configurable to include a list of association identifiers (AIDs) for each 20 MHz channel of the plurality of 20 MHz channels, each AID corresponding to one of the HE stations,
wherein the list of AIDs for a particular 20 MHz channel comprises a multi-user (MU) multiple-input multiple-output (MIMO) (MU-MIMO) group of stations, and
wherein the operations further comprise communicating with the HE stations on the indicated subchannels using a MU-MIMO OFDMA technique.

18. The non-transitory computer-readable storage medium of claim 17 wherein the indication that is transmitted to indicate which one of a plurality of 20 MHz channels to monitor for a HE signal field is a STA OFDMA pre-configuration frame configured for unicast transmission and comprises a channel monitoring bitmap that indicates one of a plurality of the 20 MHz channels.

19. A high-efficiency (HE) wireless local area network (WLAN) station comprising physical layer and medium access control layer circuitry configured to:
- receive a STA OFDMA grouping information element (IE) from a master station that indicates which one of a plurality of 20 MHz channels to monitor for a HE signal field;
- monitor the indicated 20 MHz channel for the HE signal field;
- determine from the HE signal field which of a plurality of subchannels of the indicated 20 MHz channel is allocated for communication;
- communicate with the master station on the indicated one or more subchannels in accordance with an orthogonal-frequency divisional multiple access (OFDMA) technique based on configuration information received in the HE signal field.

20. The HE station of claim 19 wherein the station (STA) OFDMA grouping ID includes a list of association identifiers (AIDs) for each 20 MHz channel of the plurality of 20 MHz channels, each AID corresponding to one of a plurality of HE stations,
- wherein the list of AIDs for a particular 20 MHz channel comprises a multi-user (MU) multiple-input multiple-output (MIMO) (MU-MIMO) group of stations, and
- wherein the HE station is configured to communicate with the master station on the indicated subchannel in accordance with a MU-MIMO OFDMA technique.

21. The HE station of claim 20 further configured to receive a STA OFDMA pre-configuration frame on the indicated subchannel, the STA OFDMA pre-configuration frame comprising a channel monitoring bitmap that indicates one of a plurality of the 20 MHz channels, the channel monitoring bitmap indicating to the HE station to switch to another channel for determining OFDMA configuration information from an HE signal field that is to be subsequently transmitted on the other channel.

22. The HE station of claim 21 comprising one or more radios and memory.

23. The HE station of claim 22 further comprising one or more antennas coupled to the one or more radios.

* * * * *

UNITED STATES PATENT AND TRADEMARK OFFICE
CERTIFICATE OF CORRECTION

PATENT NO. : 9,961,678 B2  
APPLICATION NO. : 15/023262  
DATED : May 1, 2018  
INVENTOR(S) : Li et al.

Page 1 of 1

It is certified that error appears in the above-identified patent and that said Letters Patent is hereby corrected as shown below:

On the Title Page

Page 4, Column 1, item [56], Line 61, delete ""11 ah" and insert --"11ah-- therefor Page 6, Column 2, item [56], Line 8, delete "Mechansim-MAC" and insert --Mechanism-MAC-- therefor Page 6, Column 2, item [56], Line 9, delete "00-0hew-a-simplified-str-mechansim" and insert --00-0hew-a-simplified-str-mechanism-- therefor In the Claims Column 10, Line 65, Claim 2, delete "(AIDS)" and insert --(AIDs)-- therefor Column 10, Line 66, Claim 2, delete "channels;" and insert --channels,-- therefor Column 12, Line 17, Claim 14, delete "(AIDS)" and insert --(AIDs)-- therefor Column 15, Line 20, Claim 14, delete "MIN" and insert --AIDs-- therefor Signed and Sealed this  
Fourth Day of June, 2019

Andrei Iancu  
*Director of the United States Patent and Trademark Office*